United States Patent [19]

Miyazawa et al.

[11] Patent Number: 5,753,328
[45] Date of Patent: May 19, 1998

[54] POLYESTER-METAL LAMINATED SHEET AND SEAMLESS CANS USING THE SAME

[75] Inventors: Tetsuo Miyazawa, Ayase; Masashi Ichishima; Sachiko Machii, both of Yokohama; Kenichiro Nakamaki, Hiratsuka; Katsuhiro Imazu; Masanori Aizawa, both of Yokohama, all of Japan

[73] Assignee: Toyo Seikan Kaisha, Ltd., Tokyo, Japan

[21] Appl. No.: 731,834

[22] Filed: Oct. 21, 1996

Related U.S. Application Data

[63] Continuation of Ser. No. 382,641, Feb. 2, 1995, abandoned.

[30] Foreign Application Priority Data

Feb. 4, 1994 [JP] Japan .................... 6-013019

[51] Int. Cl.$^6$ ............ B32B 15/08; B65D 25/14
[52] U.S. Cl. ........... 428/35.8; 428/35.9; 428/458; 220/415; 220/418; 220/419; 220/458; 220/906; 72/46
[58] Field of Search ............... 428/35.8, 35.9, 428/35.3, 36.91, 458; 220/458, 415, 418, 419, 456, 906, DIG. 22; 72/46, 47

[56] References Cited

U.S. PATENT DOCUMENTS

| | | | |
|---|---|---|---|
| 4,143,790 | 3/1979 | Ueno et al. | 428/35.8 |
| 4,339,483 | 7/1982 | Ueno et al. | 428/35.8 |
| 4,734,303 | 3/1988 | Fujiwara et al. | 428/35.9 |
| 5,137,762 | 8/1992 | Aizawa et al. | 428/35.8 |
| 5,144,824 | 9/1992 | Kobayashi et al. | 428/35.8 |
| 5,300,335 | 4/1994 | Miyazawa et al. | 428/35.8 |
| 5,409,129 | 4/1995 | Tsukada et al. | 428/35.8 |

FOREIGN PATENT DOCUMENTS 3934904  5/1991  Germany.

OTHER PUBLICATIONS

Abstract of JP-A-03 087 249, Apr. 12, 1991, European Patent Office.
Abstract of JP-A-05 077 359, Mar. 20, 1993, European Patent Office.
Abstract of JP-A-54 024 983, Feb. 24, 1979, European Patent Office.

*Primary Examiner*—Rena Dye
*Attorney, Agent, or Firm*—Sughrue, Mion, Zinn, Macpeak & Seas, PLLC

[57] ABSTRACT

A laminated metal sheet obtained by laminating a polyester film on a metal sheet, wherein the polyester film has a double refraction represented by the following relation, $$\Delta n = n_m - n_t$$

wherein $n_m$ is a refractive index in the direction of a maximum orientation of the film, and $n_t$ is a refractive index in the direction of thickness of the film, which is higher on the side of the front surface of the polyester film than on the side of the metal sheet, and has a peak in the double refraction in a way of thickness from the side of the front surface toward the side of the metal sheet. A seamless can formed from such a laminated metal sheet exhibits excellent shock resistance, flavor-retaining property, corrosion resistance and like properties.

10 Claims, 4 Drawing Sheets

HEATING ZONE

FIG. 8

POLYESTER-METAL LAMINATED SHEET AND SEAMLESS CANS USING THE SAME

This is a continuation of application Ser. No. 08/382,641 filed Feb. 2, 1995, which is abandoned.

BACKGROUND OF THE INVENTION

1. (Field of the Invention)

The present invention relates to a polyester-metal laminated sheet having excellent workability, adhesiveness and corrosion resistance in combination, and to seamless cans obtained by using the polyester-metal laminated sheet and having excellent wrap-seam workability, and shock resistance such as dent resistance, etc. in combination with excellent resistance against content as represented by corrosion resistance.

2. (Description of the Prior Art)

Side seamless cans have heretofore been obtained by subjecting a metal blank such as an aluminum plate, a tin plate, a tin-free steel plate or the like plate to at least one stage or plural stages of draw working between a drawing die and a punch in order to form a cup that has a barrel portion without seam on the side surfaces thereof and a bottom portion which is integrally connected to the barrel portion without forming seam, and then, as required, subjecting the barrel portion to the ironing between the ironing punch and the die in order to reduce the thickness of the barrel of the container. There has further been widely known a deep-draw working according to which the side wall portion is bent and elongated along the curvature corner portion of the redrawing die in order to reduce the thickness of the side wall portion (Japanese Laid-Open Patent Publication No. 501442/1981).

The method of coating a side seamless can with an organic film is presented by a method of laminating a resin film in advance on a metal blank which has not been formed, in addition to a widely accepted method of applying an organic paint onto the can that has been formed. Japanese Patent Publication No. 34580/1984 discloses the use of a material which is obtained by laminating a polyester film derived from terephthalic acid and tetramethylene glycol onto a metal blank. In producing redraw-formed cans by bend-elongation, furthermore, there has been known to use a metal sheet which is coated with vinyl organosol, epoxy, phenolics, polyester, acryl or the like.

There have been proposed a variety of methods of producing polyester-coated metal sheets. For instance, Japanese Laid-Open Patent Publication No. 4229/1976 discloses a film composed of a polyethylene terephthalate in which biaxial orientation is remaining in the surface thereof.

Japanese Patent Publication No. 47103/1985 discloses laminating a crystalline saturated polyester resin film on a metal sheet, by heating the metal sheet at a temperature over a range of from a melting point (Tm) of the resin through up to Tm+160° C. to laminate a film thereon, followed by quenching within 60 seconds, in order to realize a two-layer structure having an upper layer of a crystalline saturated polyester resin and a lower layer of an amorphous polyester resin having a crystallinity of from 0 to 20%.

In producing coated draw-formed cans, it has been known already to heat-treat the cans after they have been draw-formed. For instance, Japanese Patent Publication No. 35344/1984 discloses a method wherein a resin-coated metal blank is subjected to the forming such as draw-forming, etc., and is heat-treated at a temperature which is lower by 5° C. than the melting point of the resin through up to 300° C., and is then quickly quenched to a temperature which is lower by more than 30° C. than a temperature at which the resin begins to become sticky.

Moreover, Japanese Laid-Open Patent Publication No. 57514/1991 filed by the present inventors discloses a method of producing coated deep-draw-formed cans by subjecting a metal sheet to the draw-forming and deep-draw-forming, wherein a coated deep-draw-formed cup is heat-treated at a temperature which is higher than a glass transition point of the thermoplastic resin coating but is lower than a melting point thereof.

However, the above-mentioned conventional proposals are not capable of fully satisfying any of the workability, adhesiveness and resistance against the content. That is, when a can having good adhesiveness between the metal sheet and the polyester film and having excellent workability of the laminated film, is filled with a corrosive content such as acidic beverage, etc., the resistance against the content is lost; e.g., the barrier property decreases on the noncrystalline portions allowing the metal sheet to be corroded, or the film tends to be cracked upon receiving impact at a temperature lower than Tg, causing the flavor to be lost due to the elution of metal component. When it is attempted to improve the resistance against the content such as corrosion resistance and flavor-retaining property, on the other hand, the laminated film loses workability, and the film is broken or is peeled off, and cracks and pinholes develop upon the deep-draw-forming or deep-draw-ironing.

In a practical seamless can, what are particularly important are properties of a flange portion that will be wrap-seamed together with the can closure and of vicinity portions thereof. When the film is cracked or is peeled due to severe working of this portion or when large strain remains in the film of this portion, the content may leak in a short term or in a long term causing the metal to elute out. Moreover, dent resistance is among the important properties practically required for the canned products. According to the denting test for evaluating the dent resistance, impact is given to the can to such a degree that a scar of impact is formed, in order to test whether the coating of the can is completely maintained or not. This is because, in practice, the canned products may often fall and receive impact or may often collide with one another. Even in such cases, the coating on the inner surfaces should not be peeled off, and defects such as cracks and pinholes should not develop.

That is, in the seamless can and, particularly, in the draw-forming or draw-ironing that is effected for reducing the thickness of the side wall portions, there takes place a plastic flow in which the size increases in the direction of height of the can and the size contracts in the circumferential direction of the can. The plastic flow develops most conspicuously in the upper portion of the cup which serves as a flange or as a vicinity thereof, causing the film to be cracked and defects to develop latently. Moreover, adhesive force is lost between the surface of the metal and the film, and residual strain in the film causes the adhesive force to decrease between them with the lapse of time. The above-mentioned event further causes the content to leak and the metal which is the underlayer to elute out.

It would be relatively easy to analyze the event that occurs on the thus formed cup. In practice, however, the cup that is formed is then subjected to the heat-treatment and, besides, a portion corresponding to the flange is subjected to the necking, flanging and to the double wrap-seaming, causing the matter to become quite complex.

In most cases, furthermore, the content will be canned while it is hot or cold, or the canned content is sterilized at a low temperature or at a high temperature. Moreover, since the cans are widely regarded to be stronger than any other packages, the canned products are in many cases roughly handled. Under such circumstances, therefore, excellent dent resistance is very demanded for the cans.

SUMMARY OF THE INVENTION

An object of the present invention, therefore, is to provide a polyester-metal laminated sheet which has excellent workability and adhesiveness in combination with excellent flavor-retaining property and corrosion resistance, and is useful as a blank for forming cans and closures.

Another object of the present invention is to provide a seamless can obtained by using the polyester-metal laminated sheet having excellent shock resistance such as dent resistance in combination with excellent resistance against the content as represented by flavor-retaining property and corrosion resistance.

A further object of the present invention is to provide a seamless can obtained by using a polyester film-laminated material, in which the film of the flange portion and of the vicinities thereof exhibits excellent dent resistance, resistance against peeling, workability, heat resistance, shock resistance and corrosion resistance even after the heat-treatment and working carried out in the step of producing cans and even in a state where the content has been canned.

According to the present invention, there is provided a polyester-metal laminated sheet obtained by laminating a polyester film on a metal sheet, wherein the polyester film has a double refraction ($\Delta n$) as represented by the following relation (1) of from 0.020 to 0.140 on a front surface side ($\Delta n_1$) thereof and has a double refraction which is smaller than $\Delta n_1$ but is from 0.005 to 0.100 on a side ($\Delta n_3$) contacting to the metal sheet, and further has at least one peak in the double refraction in a way of thickness ($\Delta n_2$) from the front surface side to the side of the metal sheet, $$\Delta n_{1 \text{ to } 3} = n_m - n_t \quad (1)$$

wherein $n_m$ is a refractive index in the direction of a maximum orientation of the film, and nt is a refractive index in the direction of thickness of the film.

In the polyester-metal laminated sheet of the present invention, it is desired that the peak in the double refraction ($\Delta n_2$) in a way of thickness is from 0.020 to 0.160, and is higher by at least 0.005 than the skirt of the higher side. It is further desired that the peak in the double refraction in a way of thickness is located at a position of $1/50$ to $9/10$ of the thickness of the film from the side of the front surface thereof.

According to the present invention, there is provided a seamless can having excellent dent resistance obtained by deep-draw-forming or deep-draw-ironing a polyester-metal laminated sheet obtained by laminating a polyester film on a metal sheet into a cup having a bottom, and heat-treating the thus formed cup, wherein, at an upper portion of the side wall of the can, the polyester film has a double refraction ($\Delta n$) as represented by the following relation (2) of from 0.020 to 0.180 on a front surface side ($\Delta n_4$) thereof, has a double refraction which is smaller than $\Delta n_4$ but is from 0.005 to 0.100 on a side ($\Delta n_7$) contacting to the metal sheet, has at least two peaks in the double refraction in a way of thickness from the front surface side to the side of the metal sheet, and has a peak ($P_1$)($\Delta n_5$) in the double refraction on a side close to the front surface and a peak ($P_2$)($\Delta n_6$) in the double refraction on a side close to the metal sheet, $$\Delta n_{4 \text{ to } 7} = n_h - n_t \quad (2)$$

wherein $n_h$ is a refractive index of the film in the lengthwise direction of the can, $n_t$ is a refractive index in the direction of thickness of the film, and the film at the upper portion of the side wall of the can is located at a position at right angles with the direction in which the metal sheet of a neck portion (designated at 4 in FIG. 4) is rolled.

In the seamless can of the present invention, it is desired that a peak ($P_1$)($\Delta n_5$) in the double refraction close to the front surface side in a way thickness is from 0.020 to 0.220, and is higher by at least 0.005 than the skirt of the higher side, that a peak ($P_2$) ($\Delta n_6$) in the double refraction close to the metal sheet is from 0.010 to 0.200, and is higher by at least 0.005 than the skirt of the higher side, and that the peak ($P_1$)($\Delta n_5$) in the double refraction close to the front surface in a way of thickness is located at a position of from $1/50$ to $9/10$ of the thickness of the film from the side of the front surface thereof and the peak ($P_2$)($\Delta n_6$) in the double refraction close to the metal sheet is located at a position of from $1/10$ to $49/50$ of the thickness of the film from the side of the front surface thereof, thus being separated away from each other.

At an upper portion of the side wall of the can, furthermore, it is desired that a trans ratio (Rt) of ethylene glycol residue found by measuring the infrared-ray absorption by the ATR (attenuated total reflection) method is from 0.1 to 1.5 on the side of the front surface of the film and is from 0.1 to 1.5 on the side contacting to the metal sheet.

DETAILED DESCRIPTION OF THE INVENTION

A polyester-metal laminated sheet of the present invention is obtained by laminating a polyester film on a metal sheet.

wherein the polyester film that is laminated has a double refraction ($\Delta n$) as represented by the aforementioned relation (1) of from 0.020 to 0.140 on a front surface side ($\Delta n_1$) thereof and has a double refraction which is from 0.005 to 0.100 on a side ($\Delta n_3$) contacting to the metal sheet, the double refraction being higher on the side of the front surface of the film than on the side adhered to the metal sheet This is because, the polyester film on the side of the metal sheet is almost losing the molecular orientation due to partial or complete melting caused by the heat-adhesion of the polyester and the subsequent quick quenching, whereas the polyester film on the side of the front surface thereof is still having biaxial orientation though it is relaxed to some extent since the front surface side is heated at a temperature which is relatively low and is quickly quenched.

In the polyester-metal laminated sheet of the present invention, what makes a novel and distinguished feature is that the laminated film in a state of being laminated has at least one peak in the double refraction in a way of thickness ($\Delta n_2$) from the surface thereof to the side of the metal plate, i.e., has a portion that is biaxially oriented to a high degree in a way of the thickness of the film.

Figure 1:
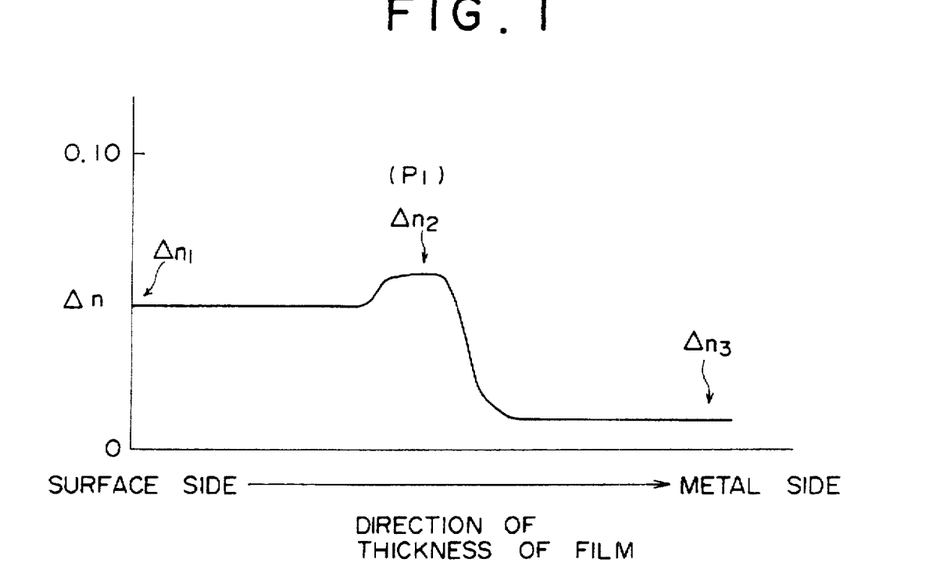
FIG. 1 is a graph showing a distribution of double refractions of a polyester film layer of a polyester-metal laminated sheet in the direction of thickness of the polyester film layer.

FIG. 1 is a graph plotting relationships between the size of the polyester film in the direction of thickness with the surface thereof as origin and the double refraction ($\Delta n$) of the polyester using the polyester-metal laminated sheet of the present invention, from which it will be obvious that a peak in the double refraction exists in a way of thickness from the surface of the polyester film toward the side of the metal sheet.

With the double refractions being distributed in the direction of thickness as described above, the film on the polyester-metal laminated sheet of the present invention makes it possible to accomplish excellent workability, adhesiveness and corrosion resistance.

Reference should be made to Table 1 appearing later. In the case of a polyester-metal laminated sheet which has a higher double refraction on the side of the front surface of the film than on the side of the metal sheet but does not have a peak in the double refraction in the way of the thickness, satisfactory workability and film adhesion are obtained when the double refraction is low on the side of the front surface (Comparative Example 4) but underfilm corrosion (UFC) takes place to a conspicuous degree. In the polyester-metal laminated sheet of the above-mentioned type, on the other hand, when the double refraction is increased on the side of the front surface and biaxial molecular orientation is retained (Comparative Example 1), deterioration in the workability becomes more serious than the problem of corrosion resistance, and the film is broken or is peeled off, and cracks and pinholes develop during the severe working condition such as deep-draw-forming or deep-draw-ironing.

By using the polyester-metal laminated sheet (Example 1) having a higher double refraction on the side of the front surface of the film than on the side of the metal sheet and having a peak in the double refraction in the way of thickness from the front surface toward the surface on the side of the metal sheet as contemplated by the present invention, on the other hand, the film exhibits good adhesiveness to the metal, and can be subjected to the severe working such as deep-draw-forming or deep-draw-ironing without being broken or peeled off or without developing cracks or pinholes. Besides, the laminated film after the working exhibits excellent corrosion resistance without developing underfilm corrosion (UFC). The above-mentioned properties are not only maintained in the flange portion and in the vicinities thereof of the seamless can but excellent dent resistance is maintained in these portions as well.

The polyester layer that is laminated of the present invention comprises a portion of a low double refraction on the side of the metal sheet, a portion of a high double refraction on the side of the front surface, and a portion having peak in the double refraction located therebetween. Among them, what plays the role of adhesion to the metal sheet is the portion of low double refraction on the side of the metal sheet, and what contributes to enhancing workability and chiefly helps prevent the denting is the portion of high double refraction on the side of the front surface. The intermediate portion having peak in the double refraction works as a barrier against the corrosive components, and further suppresses amorphous crystallization, contributing to enhancing dent resistance.

The double refraction $\Delta n_1$ of the polyester film on the front surface side should be from 0.020 to 0.140, and particularly, from 0.020 to 0.100 and, more preferably, from 0.020 to 0.090. When the double refraction is smaller than the above range, the obtained can becomes unsatisfactory with respect to dent resistance. When the double refraction is greater than the above range, on the other hand, the workability becomes inferior to that of the laminated sheet which has the double refraction lying within the above-mentioned range. On the other hand, the double refraction $\Delta n_3$ on the side contacting to the metal sheet should be smaller than $\Delta n_1$ but should be from 0.005 to 0.100 and, particularly, from 0.005 to 0.080. The adhesion to the metal is lost either when the double refraction is smaller than the above range or is larger than the above range. The reason why the adhesion decreases with a decrease in the double refraction on the side contacting to the metal sheet is attributed to the crystallization caused by the heat-treatment during the forming of the can or after the canning.

On the other hand, the peak in the double refraction ($\Delta n_2$) in the way of thickness should be from 0.020 to 0.160 and, particularly, from 0.020 to 0.140 and, more preferably, from 0.020 to 0.100, and should be higher by at least 0.005 than the skirt of the higher side, from the standpoint of workability, corrosion resistance and dent resistance. From these properties, the peak in the double refraction in the way of thickness should be located at a position of from $1/50$ to $9/10$ and, particularly, from $1/10$ to $9/10$ of the thickness of the film from the side of the front surface thereof.

The polyester-metal laminated sheet of the present invention can be obtained by a method that will be described later, and can further be obtained by utilizing the phenomenon of return of orientation in a transient state where the polyester is shifting from the molten phase into the solid phase.

The seamless can of the present invention is obtained by forming a laminated metal sheet obtained by laminating a polyester film on a metal sheet into a cup having bottom by the deep-draw-forming or deep-draw-ironing, and heat-treating the thus worked cup. In the thus draw-formed can, a distinguished feature resides in that in the upper portion of the side wall of the can, the polyester film has a double refraction ($\Delta n$) as represented by the aforementioned relation (2) of from 0.020 to 0.180 on the front surface side ($\Delta n_4$) thereof, has a double refraction of from 0.005 to 0.100 on the side ($\Delta n_7$) contacting to the metal sheet ($\Delta n_4 > \Delta n_7$), has at least two or more peaks in the double refraction in a way of thickness from the front surface side to the side f the metal sheet, and has a peak ($P_1$)($\Delta n_5$) in the double refraction on a side close to the front surface and a peak ($P_2$)($\Delta n_6$) in the double refraction on a side close to the metal sheet.

The double refraction on the front surface side of the polyester film, low double refraction on the side of the metal plate and peak ($P_1$) in the double refraction correspond to the distribution of double refractions of the polyester-metal laminated sheet that is used. In the seamless can of the present invention, however, another peak ($P_2$) is appearing in the double refraction located on a side closer to the metal sheet than the location of the peak ($P_1$) in the double refraction, in addition to the above-mentioned distribution of orientations.

Figure 2:
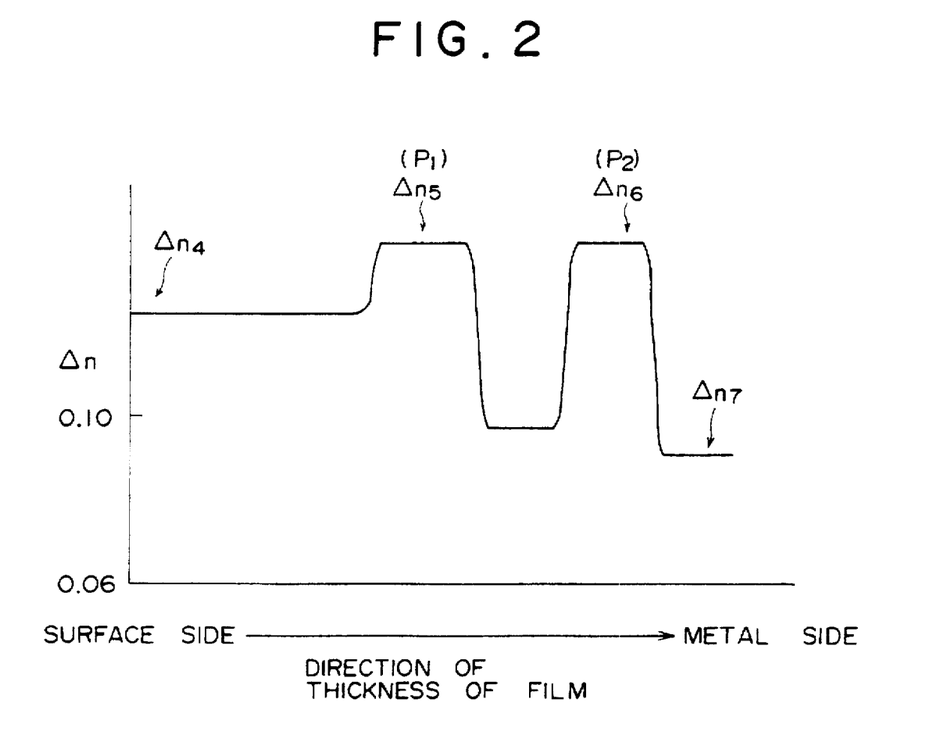
FIG. 2 is a graph showing a distribution of double refractions of the polyester film layer at an upper portion of the side wall of a seamless can in the direction of thickness of the polyester film layer.

FIG. 2 is a graph plotting relationships between the size in the direction of thickness of the polyester film and the double refraction ($\Delta n$) of the polyester film with the surface of the film as origin at the upper portion on the side wall of the seamless can of the present invention, and where there exist a peak ($P_1$) in the double refraction in a way of thickness from the surface of the film to the side of the metal sheet and a peak ($P_2$) in the double refraction on a side closer to the metal than the above peak.

The peak ($P_1$) in the double refraction is due to the biaxial molecular orientation in the laminate that is used, and the peak ($P_2$) in the double refraction develops during the step of forming the seamless can. The monoaxial orientation developed through the draw-redraw-forming or draw-redraw-ironing is further grown (crystallized) by the heat-treatment resulting in the development of the peak ($P_2$) in the double refraction.

Of the polyester film, it is considered that what permits the permeation of corrosive components in the content is the amorphous portion provided there is no defect in the film. According to the present invention, a high degree of orientation is imparted to the lowly orientated portion of the polyester in order to improve barrier property against corrosive components and to prevent underfilm corrosion (UFC) even when highly corrosive content is canned.

In the seamless can of the present invention, it is desired that a peak ($P_1$)($\Delta n_5$) in the double refraction close to the front surface in a way of thickness is from 0.020 to 0.220, and is higher by at least 0.005 than the skirt of the higher side, that a peak ($P_2$)($\Delta n_6$) in the double refraction close to the metal sheet is from 0.010 to 0.200, and is higher by at least 0.005 than the skirt of the higher side, and that the peak ($P_1$)($\Delta n_5$) in the double refraction close to the front surface in a way of thickness is located at a position of from 1/50 to 9/10 of the thickness of the film from the side of the front surface thereof and the peak ($P_2$)($\Delta n_6$) in the double refraction close to the metal sheet is located at a position of from 1/10 to 49/50 of the thickness of the film from the side of the front surface thereof, thus being separated away from each other, from the standpoint of wrap-seam working, corrosion resistance and dent resistance.

At an upper portion of the side wall of the can, furthermore, it is desired that a trans ratio (Rt) of ethylene glycol residue found by measuring the infrared-ray absorption by the ATR (attenuated total reflection) method is from 0.1 to 1.5 and, particularly, from 0.1 to 1.0, and, more preferably, from 0.1 to 0.8 on the side of the front surface of the film, and is from 0.1 to 1.5, particularly, from 0.1 to 1.0 and, more preferably, from 0.1 to 0.8 on the side contacting to the metal sheet on the side contacting to the metal sheet than on the side of the front surface of the film, from the standpoint of wrap-seam workability, corrosion resistance and dent resistance.

Figure 3A:
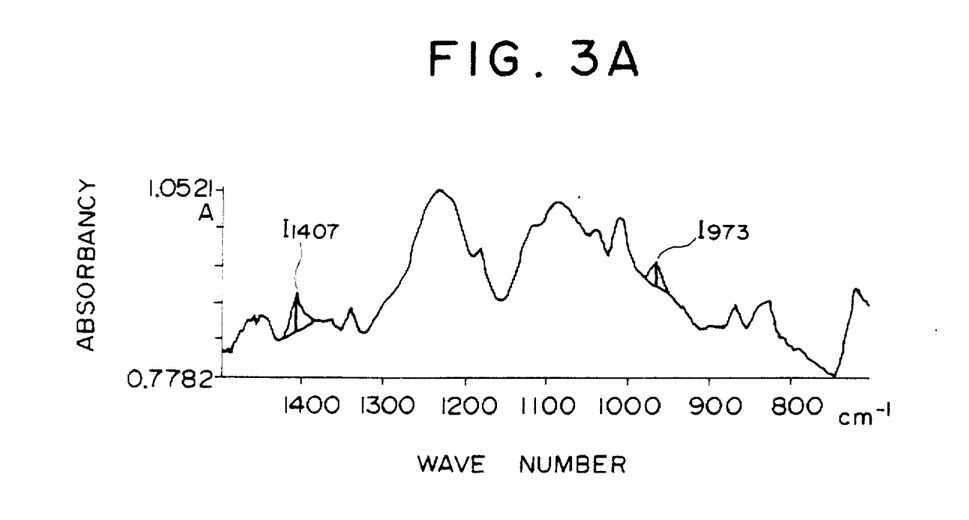
FIG. 3(A) is a graph showing infrared-ray absorption spectra of the polyester film on the side of the front surface thereof at the upper portion of the side wall of the seamless can of the invention as measured by the ATR method.
Figure 3B:
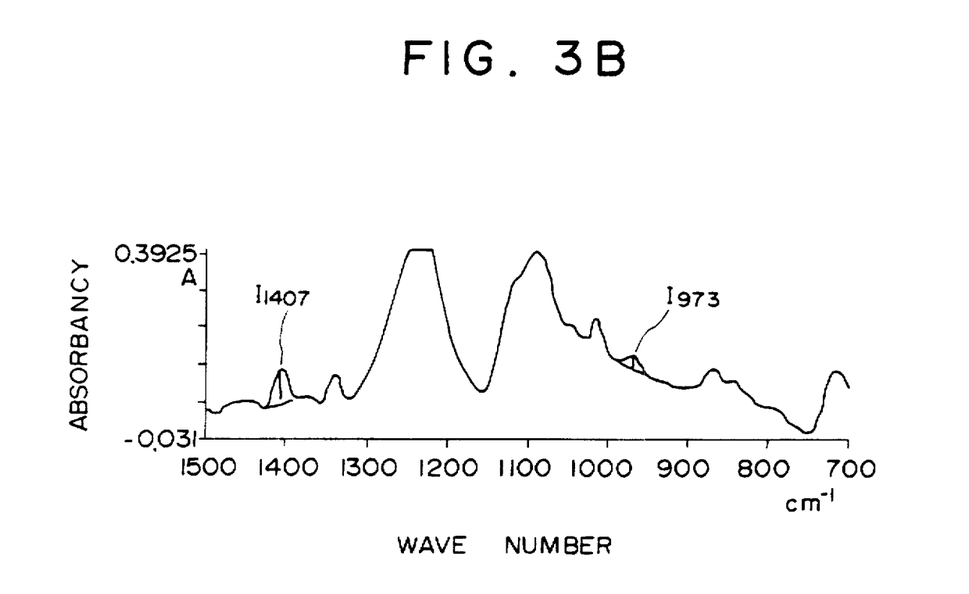
FIG. 3(B) is a graph showing infrared-ray absorption spectra of the polyester film on the side of the metal sheet at the upper portion of the side wall of the seamless can of the invention as measured by the ATR method.

FIG. 3(A) is a graph showing infrared-ray absorption spectra of the polyester film on the side of the front surface thereof at the upper portion of the side wall of the can as measured by the ATR method, and FIG. 3(B) is a graph showing infrared-ray absorption spectra of the polyester film on the side of the metal sheet at the upper portion of the side wall of the can as measured by the ATR method. From the absorbancy ($I_{1407}$) near the wave number 1407 $cm^{-1}$ which is the characteristic absorption representing the whole amount of the ethylene glycol residue group and absorbancy ($I_{973}$) near the wave number 973 $cm^{-1}$ which is the characteristic absorption representing the amount of the ethylene glycol residue group of the trans type, the trans ratio (Rt) can be found as a ratio of the two, i.e., according to the following relation (3), $$Rt = I_{973}/I_{1407} \quad (3)$$

The trans ratio (Rt) has the following meaning. In the case of crystals, the ethylene glycol residue group in the polyester takes the arrangement of a trans type, whereby the trans ratio has a correlation to the crystallinity of the polyester. The crystallinity can be measured by the X-ray diffraction method, density method or the like method. With these methods, however, though the average crystallinity of the whole polyester film can be found, it is not allowed to find the crystallinity of microscopic portions. The ATR method, on the other hand, makes it possible to find crystallinity even on microscopic portions.

In the seamless can, enhancing the crystallinity of the polyester film that is laminated is effective in improving barrier property against corrosive components and hence in improving the corrosion resistance resulting, however, in an increase in the brittleness deteriorating workability and shock resistance such as dent resistance. When orientation that is desirable from the standpoint of dent resistance is retained in the polyester film on the front surface side thereof and when the polyester film on the side of the metal sheet that is lowly oriented is further oriented and is crystallized, then, it is allowed to accomplish workability, corrosion resistance and dent resistance in a well-balanced manner.

Figure 4:
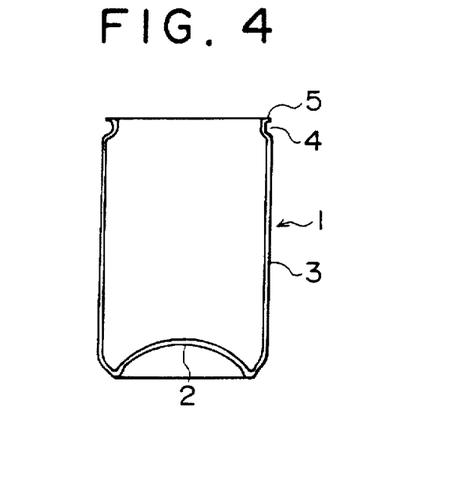
FIG. 4 is a sectional view illustrating a laminated seamless can according to the present invention.

Referring to FIG. 4 which illustrates a seamless can of the present invention, the seamless can 1 is formed by deep-draw-forming (draw-redraw-forming) the aforementioned polyester-metal laminated sheet, and has a bottom portion 2 and a side wall portion 3. As desired, a flange portion 5 is formed at an upper end of the side wall portion 3 via a neck portion 4. In this can 1, the side wall portion 3 has a thickness smaller than that of the bottom portion 2 due to bend-elongation.

Figure 5:
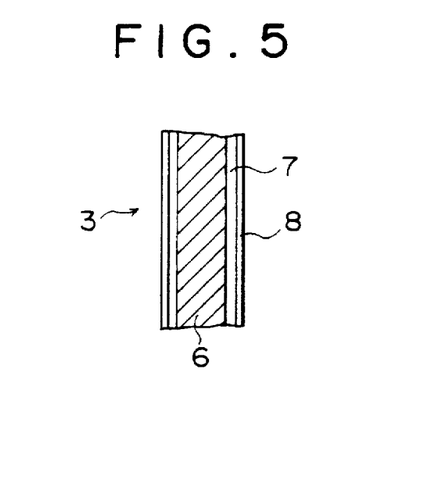
FIG. 5 is a diagram illustrating a cross-sectional structure of the side wall portion of the laminated seamless can of the present invention.

Referring to FIG. 5 showing the cross-sectional structure of the side wall portion 3, the side wall portion 3 includes a metal substrate 6 and a polyester film 7. The metal substrate 6 has an outer coating 8 which may be the same as a coating on the inner surface of the film or may be any widely known paint for cans or resin film coating.

Figure 6:
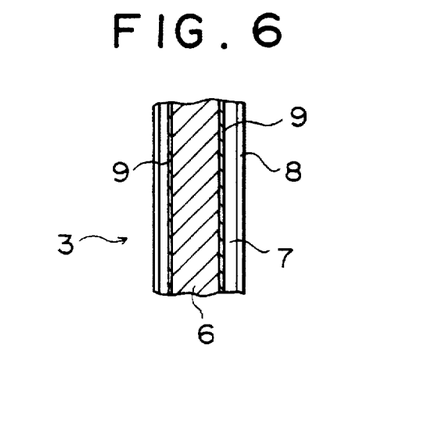
FIG. 6 is a diagram illustrating another cross-sectional structure of the side wall portion of the laminated seamless can of the present invention.

FIG. 6 illustrates another cross-sectional structure of the side wall portion which is the same as that of the case of FIG. 5 except that a primer layer 9 for adhesion is provided between the polyester layer 7 and the metal substrate 6.

In both of these cases, the cross-sectional structure of the bottom portion 2 is the same as the cross-sectional structure of the side wall portion 3 except that it has not been subjected to the draw-form working.

[Metal blank]

According to the present invention, a variety of surface-treated steel plates and light metal plates such as of aluminum can be used as a metal sheet.

The surface-treated steel plate may be obtained by annealing a cold-rolled steel plate, subjecting it to the secondary cold-rolling, and effecting one or two or more kinds of surface treatment such as zinc plating, tin plating, nickel plating, electrochromate treatment and chromate treatment. A preferred example of the surface-treated steel plate will be an electrochromate-treated steel plate having a metal chromium layer at a rate of from 10 to 200 mg/m² and a chromate layer at a rate of from 1 to 50 mg/m² (in terms of a metal chromium). This surface treated steel plate exhibits excellent film adhesion property and corrosion resistance in combination. Another example of the surface-treated steel plate will be a hard tin plate on which tin is plated at a rate of from 0.5 to 11.2 g/m². It is desired that the tin plate is subjected to the chromate treatment or to the chromate/phosphate treatment so that the amount of chromium is from 1 to 30 mg/m² reckoned as metal chromium.

As a further example, there can be used an aluminum coated steel plate which is plated with aluminum or on which aluminum is adhered with pressure.

As a light metal plate, there can be used a so-called pure aluminum plate as well as an aluminum alloy plate. The aluminum alloy plate which is excellent both in corrosion resistance and workability has a composition of 0.2 to 1.5% by weight of manganese, 0.8 to 5% by weight of magnesium, 0.25 to 0.3% by weight of zinc, 0.15 to 0.25% by weight of copper, and the remainder of aluminum. It is desired that the light metal plate is subjected to the chromate treatment or to the chromate/phosphate treatment so that the amount of chromium is from 20 to 300 mg/m² in terms of as a metal chromium.

The blank thickness of the metal plate, i.e., the thickness ($t_B$) of the can bottom portion may vary depending upon the kind of the metal, field where the can is used and the size of the can, but should generally be from 0.10 to 0.50 mm. Among them, the thickness should be from 0.10 to 0.30 mm in the case of a surface-treated steel plate and from 0.15 to 0.40 mm in the case of a light metal plate.

[Polyester film]

The polyester film used in the present invention should be a copolymerized polyester derived from a dibasic acid comprising chiefly a terephthalic acid and from a diol comprising chiefly an ethylene glycol, on at least the surface that comes in contact with the content. The dibasic acid other than terephthalic acid may be isophthalic acid or the like acid, and the diol component other than ethylene glycol may be 1,4-butane diol or the like.

The acid components in the copolymerized polyester is preferably used terephthalic acid and isophthalic acid from the standpoint of adjusting the degree of orientation and crystallinity and from the standpoint of flavor-retaining property. As acid components, there may be contained other dibasic acids in small amounts of not larger than, for example, 3 mol %. From the standpoint of preventing adsorption of flavor components and suppressing the elution of polyester components, however, it is desired that aliphatic dibasic acids are not contained. A polyester containing isophthalic acid as an acid component exhibits large barrier effect against various components, flavor components and corrosive components, and adsorbs these components little.

The diol component contained in the copolymerized polyester may chiefly be comprised of an ethylene glycol. It is desired that not smaller than 95 mol % and, particularly, not smaller than 97 mol % of the diol component comprises an ethylene glycol, from the standpoint of obtaining molecular orientation and barrier property against corrosive components and flavor components.

In the present invention, examples of the dibasic acid other than terephthalic acid and isophthalic acid include p-β-oxyethoxybenzoic acid, naphthalene 2,6-dicarboxylic acid, diphenoxyethane-4,4'-dicarboxylic acid, 5-sodium sulfoisophthalic acid, hexahydroterephthalic acid, adipic acid, sebacic and, etc. Examples of the diol component other than ethylene glycol include such glycol components as propylene glycol, 1,4-butane diol, neopentyl glycol, 1,6-hexylene glycol, diethylene glycol, triethylene glycol, cyclohexane dimethanol and ethylene oxide adduct of bisphenol A. These components are allowed to be contained in small amounts but are not essential components.

The copolymerized polyester should have a molecular weight over a range capable of forming a film and may have an intrinsic viscosity [η] of from 0.5 to 1.5 and, particularly, from 0.6 to 1.5 as measured by using a phenol/tetrachloroethane mixture solvent.

Moreover, a preferred copolymerized polyester comprises, in average, 80 to 99% of terephthalic acid and 1 to 20% of isophthalic acid on at least the surface that comes into contact with the content. Here, the words "in average" is used because the polyester film may be a blend of plural kinds of copolymerized polyesters containing isophthalic acid in different amounts, or may be a laminate of films of plural kinds of copolymerized polyesters containing isophthalic acid in different amounts.

The polyester film used for the present invention may have a thickness of from 2 to 100 μm and, particularly, from 5 to 50 μm from the standpoint of protecting the metal and workability.

The polyester film should generally be biaxially drawn. The degree of biaxial drawing can be confirmed by X-ray diffraction method, polarized fluorometric method, or double refraction method.

The polyester film may be blended with widely-known blending agents for films, such as antiblocking agent of amorphous silica, pigment like titanium dioxide (titanium white), various antistatic agents, and lubricating agent according to recipe known per se.

Though not generally needed, when the adhesive primer is used, the surface of the biaxially drawn copolyester film may have been treated with corona discharge in order to enhance adhesiveness of the adhesive primer to the film. It is desired that the treatment with corona discharge is effected to such a degree that the wet tension is not smaller than 44 dyne/cm.

It is further allowable to treat the film with plasma or flame in a customary manner to improve adhesiveness or to apply coating such as urethan resin or modified polyester resin in order to improve adhesiveness.

[Method of Forming a Laminated Metal Sheet]

The polyester-metal laminated sheet of the present invention has a distribution of double refractions as described above, and can be prepared by utilizing the phenomenon of return of orientation in a transient state where the polyester is shifting from the molten phase into the solid phase.

Figure 7:
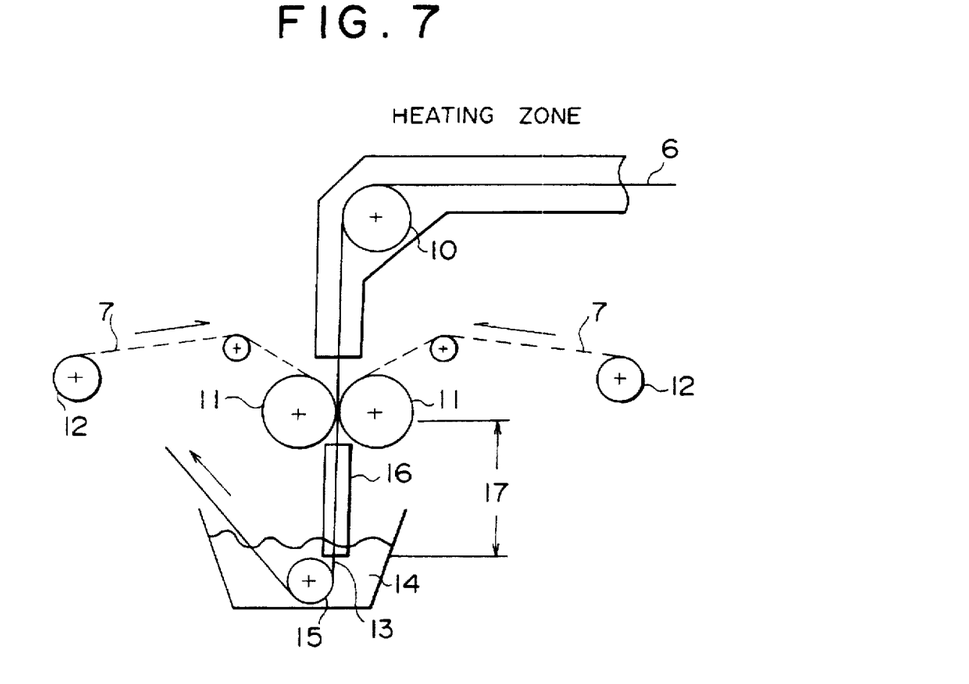
FIG. 7 is a diagram for explaining the method of producing the polyester-metal laminated sheet.

Referring to FIG. 7 for explaining the method of producing the polyester-metal laminated sheet, a metal sheet 6 is heated by a heating roll 10 at a temperature ($T_1$) higher than a melting point (Tm) of the polyester, and is fed into between laminate rolls 11 and 11. On the other hand, polyester films 7 are unwound from the feeder rolls 12 and are so fed that the metal sheet 6 is sandwiched by them therebetween the laminate rolls 11 and 11 which have been maintained at a temperature ($T_2$) lower than that of the heating roll 10, whereby the polyester films 7 are heat-adhered onto both surfaces of the metal sheet 6. Under the laminate rolls 11 and 11 is provided a water vessel containing the cooling water 14 for quickly quenching a laminated metal sheet 13 that is obtained. In the water vessel is arranged a guide roller 15 for guiding the laminated metal sheet 13. A predetermined gap 17 is formed between the laminate rolls 11, 11 and the cooling water 14, a temperature-retaining mechanism 16 is provided, as required, in the gap 17 to retain the temperature of the laminated metal sheet 13 within a predetermined temperature range ($T_3$), so that peaks in the biaxial orientation are formed in a way of thickness of the film due to the return of orientation in a transient state where the polyester is shifting from the molten phase to the solid phase.

The temperature ($T_1$) for heating the metal sheet 6 is usually from Tm–50° C. to Tm+100° C. and, particularly, from Tm–50° C. to Tm+50° C., and the temperature ($T_2$) for heating the laminate rolls 11 is from $T_1$–300° C. to $T_1$–10° C. and, particularly, from $T_1$–250° C. to $T_1$–50° C. With the temperature being set as described above, a temperature gradient corresponding to the above temperature difference is formed in the polyester on the metal sheet. Though the temperature gradient gradually shifts toward the low temperature side and then extinguishes, a portion in the way of thickness of the polyester film from the side of the front surface thereof to the side of the metal sheet passes, spending a sufficiently long period of time, through a temperature region in which there takes place a phenomenon of return of orientation in a transient state of from the molten phase to the solid phase. Being assisted by the temperature-retaining mechanism 16, therefore, the temperature on the surface of the film of the laminated metal sheet after having passed through the laminated rolls is maintained to be higher than the heat-set temperature of the polyester resin but lower than the melting point thereof. The temperature $T_3$ should be retained for 0.1 to 30 seconds and, particularly, 0.3 to 10 seconds. When the temperature of the laminate rolls 11 is high, the temperature-retaining mechanism 16 is not necessary, and the temperature $T_3$ is retained by adjusting the speed of passing the metal sheet.

The adhesive primer that is provided as required between the polyester film and the metal blank exhibits excellent adhesiveness to both the metal blank and the film. A representative example of the primer paint exhibiting excellent adhesiveness and corrosion resistance may be a phenol-epoxy resin comprising a bisphenol-type epoxy resin and a resol-type phenolaldehyde resin derived from various phenols and a formaldehyde, and, particularly, a paint containing a phenol resin and an epoxy resin at a weight ratio of from 60:40 to 5:95 and, particularly, from 50:50 to 10:90.

The adhesive primer layer may generally be provided maintaining a thickness of from 0.01 to 10 μm. The adhesive primer layer may be formed on the metal blank in advance or may be formed on the polyester film in advance.

[Deep-Draw-Forming]

According to the present invention, the thus obtained polyester-metal sheet is draw-formed or deep-draw-formed into a cup with bottom between a punch and a die. As required, furthermore, the cup with bottom is bend-elongated or is ironed through the draw-forming to reduce the thickness of the side wall of the cup. The cup with bottom is then heat-treated through at least one stage and is, as required, quickly quenched.

The laminate is draw-formed by means which has been known per se. According to the deep-draw-forming (draw-forming/redraw-forming) as shown, for example, in FIG. 8, a pre-draw-formed cup 21 obtained by using the coated metal sheet is held by a holding member 22 inserted in the cup and a redrawing die 23 located beneath it. In concentric with the holding member 22 and the redrawing die 23, a redrawing punch 24 is provided so as to enter into, and come out from, the holding member 22. The redrawing punch 24 and the redrawing die 23 are moved relative to each other so as to be in mesh with each other.

Figure 8:
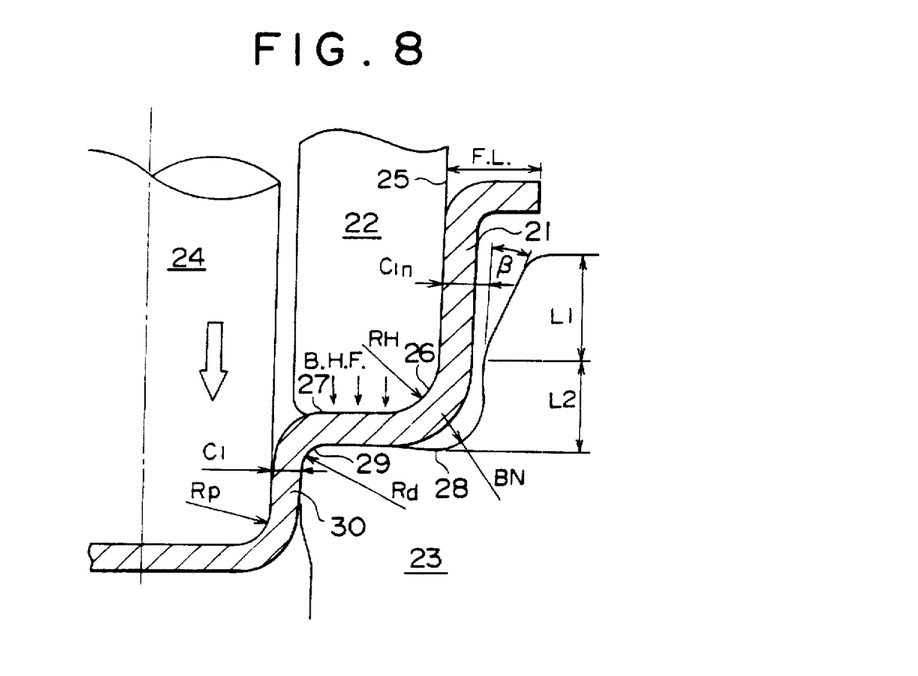
FIG. 8 is a diagram for explaining the redraw-forming.

Then, the side wall of the pre-draw-formed cup 21 passes through a curvature corner portion 26 from the outer peripheral surface 25 of the annular holding member 22, vertically bent inwardly of the diameter, passes through a portion defined by the annular bottom surface 27 of the annular holding member 22 and the upper surface 28 of the redrawing die 23, bent nearly vertically in the axial direction by a working corner portion 29 of the redrawing die 23, and is formed into a deep-draw-formed cup 30 having a diameter smaller than that of the pre-draw-formed cup 21. Thickness of the side wall can be further reduced by bend-elongation or ironing.

In the case of a seamless can, the drawing ratio $R_D$ defined by the following relation (4), $$R_D = \frac{D}{d} \quad (4)$$

where D is a diameter of the laminated material that is sheared, and d is a diameter of the punch, should lie within a range of from 1.1 to 3.0 in one stage, and should lie within a range of from 1.5 to 5.0 as a total.

In the case of the bend-elongation or ironing, furthermore, the thickness of the side wall of the can should be reduced to 5 to 45% and, particularly, 5 to 40% of the blank thickness ($t_B$).

According to the present invention, thereafter, the draw-formed container is subjected to at least one stage f heat treatment. The heat treatment is executed for various purposes; i.e., chiefly for removing strain remaining in the film being caused by the working, for volatilizing the lubricant used for the working from the surfaces thereof, and for drying and curing the ink printed on the surfaces. The heat treatment can be executed by a widely known heating device such as an infrared-ray heater, a hot air circulation furnace, an induction heater, or the like. The heat treatment may be carried out in one stage, in two stages or in many more stages. The heat treatment should be carried out at a temperature of from 180° to 240° C. for a period of, generally, from one second to 10 minutes.

After the heat treatment, the container may be quickly quenched or may be left to cool. A film or a laminated sheet can be quickly quenched with ease, but a container having a three-dimensional shape and a large heat capacity in the case when it is made of a metal will be quenched with difficulty when it is carried out on an industrial scale. According to the present invention, however, the growth of crystals is suppressed even without effecting the quick quenching, and excellent properties are obtained in combination. It is of course allowable, as desired, to employ any quickly quenching means such as blowing cold air, sprinkling cold water, or the like.

EXAMPLES

The invention will now be described by way of the following examples.

Characteristic values of the present invention are measured in compliance with the methods described below.

(1) Double Refraction

The laminated sheet for sampling is cut into a square of a side of 5 mm with a portion, which will become the center of the bottom after molding, as a center. The upper portion of the side wall of the can to be sampled is a neck portion designated at 4 in FIG. 4. The sample is cut into a square of a side of 5 mm with a point 5 mm away from the tip of the flange as a center, on an axis in a direction at right angles with a direction in which the metal sheet is rolled. The thus cut samples are dissolved in 50% hydrochloric acid to isolate the film. Then, the samples are dried in vacuum for at least 24 hours.

The films at predetermined positions of the laminated sheet and of the upper portion of the side wall of the can are buried in an epoxy resin, and are cut into 3 μm so as to be in parallel with the direction of thickness (corresponds to $n_t$) and in parallel with the direction of a maximum orientation of the biaxially oriented plane (corresponds to $n_m$) in the case of the laminated film, and so as to be in parallel with the direction of thickness (corresponds to $n_t$) and in parallel with the direction of length of the can (corresponds to $n_h$) in the case of the film at the upper portion of the side wall of the can, and retardation is measured using a polarization microscope. The double refraction is found by averaging the values at five portions in cross section. The values of $\Delta n_1$, $\Delta n_3$, $\Delta n_4$ and $\Delta n_7$ are, respectively, average values of double refraction up to 2 μm in the direction of thickness, $\Delta n_1$ and $\Delta n_4$ are, respectively, average values of double refraction up to 2 μm from the side of the front surface of the film, and $\Delta n_3$ and $\Delta n_7$ are, respectively, average values of double refraction up to 2 μm from the side of the metal. A wavelength of 546 nm is employed for the measurement.

(2) Trans Ratio.

The trans ratios of the films sampled in (1) above on the side of the metal sheet and on the side of the front surface are measured in compliance with the ATR method (using FT-IR1650 manufactured by Parking-Elmer Co. and IR-PLAN manufactured by Spectratek Co.). The trans ratio on the side of the metal sheet is found from the intensity of infrared-ray absorption spectrum in compliance with the relation (3) as an average value at three places in the sample film under the conditions where the angle of incidence of infrared-rays is 45 degrees, the direction of optical path is at right angles with the direction of length of the can, and the objective lens is brought into contact with the film surface on the side of the metal sheet such that the area is a square which is not larger than about 300 μm. The trans ratio on the side of the front surface is found based on the same measurement and the same data processing by bringing the front surface side of the film (surface on the side opposite to the metal sheet) into contact.

(3) Testing the preservation of cola.

A steel rod 65.5 mm in diameter is placed just under the neck portion of a can on an axis which is at right angles with a direction in which the metal material is rolled, the can being filled with a cola and maintained at 5° C. A weight of 1 kg is allowed to fall from a height of 60 mm to give impact thereto. The condition of the can is checked after it is preserved for a year at room temperature of 37° C.

(Example 1)

A copolymerized polyester (Tm=228° C.) comprising terephthalic acid/isophthalic acid (weight ratio of 88/12) and an ethylene glycol was drawn at 120° C. into 3.0 times in the longitudinal direction and into 3.0 times in the transverse direction, and was heat-treated at 180° C. to obtain a biaxially drawn film having a thickness of 25 μm. Then, the biaxially drawn film was heat-laminated on both surfaces of a tin-free steel (TFS) plate having a blank thickness of 0.175 mm and a tempering degree of DR-9 while heating the steel plate at 240° C., heating the laminate rolls at 150° C. and passing the steel plate at a speed of 40 m/min. followed by quick quenching with water in order to obtain a laminated metal sheet. Vaseline was applied onto the coated metal sheet which was then punched into a disk of a diameter of 179 mm to obtain a shallow-draw-formed cup. The drawing ratio in this step was 1.56. Next, the cup was subjected to primary and secondary thickness-reducing redraw-formings.

| Primary redrawing ratio | 1.37 |
| Secondary redrawing ratio | 1.27 |

The thus obtained deep-draw-formed cup exhibited the following properties:

| Diameter of cup | 66 mm |
| Height of cup | 128 mm |
| Change in the thickness of the side wall | –20% (with respect to the blank thickness) |

The deep-draw-formed cup was domed in a customary manner, and was heat-treated at 215° C. After left to cool, the cup was trimmed at its open edge portion, printed on the curved surface, dried, and was flanged to obtain a 350-g two-piece can. The can was filled with a cola and after the neck portion was dented, preserved at room temperature to examine the state on the inner surface of the can and leakage. Table 1 shows the properties of the laminated film and the film on the can barrel as well as the results of preservation test.

(Example 2)

The biaxially drawn film used in Example 1 was heat-laminated by heating the laminate rolls at 155° C., and, then, the procedure was carried out in the same manner as in Example 1 with the exception of using an ironing ring (having an inner diameter of 66.368 mm) during the thickness-reducing redraw-forming. Table 1 shows the properties of the laminated film and the film on the can barrel as well as the results of preservation test.

(Example 3)

A laminate comprising, as a polyester layer A, a copolymerized polyester (Tm=228° C.) of terephthalic acid/isophthalic acid (weight ratio of 88/12) and an ethylene glycol and, as a polyester layer B, a polyester (Tm=236° C.) of a blend of a copolymer of terephthalic acid/isophthalic acid (weight ratio of 94/6) and an ethylene glycol, and a polybutylene terephthalate at a weight ratio of 80:20, was drawn at 120° C. into 3.0 times in the longitudinal direction and into 3.1 times in the transverse direction, and was heat-treated at 180° C. to obtain a biaxially drawn film. The two-layer film was comprised of a polyester layer A of 4 μm in thickness and a polyester layer B of 16 μm in thickness, and possessed a total thickness of 20 μm. The two-layer film was heat-laminated in a manner that the polyester layer B was in contact with the metal sheet, and a deep-draw-formed cup was obtained in the same manner as described in Example 1, and the procedure was then carried out in the same manner as in Example 1 with the exception of effecting the heat treatment at 225° C. Table 1 shows the properties of the laminated film and the film on the can barrel as well as the results of preservation test.

(Example 4)

A copolymerized polyester (Tm=228° C.) of terephthalic acid/isophthalic acid (weight ratio of 88/12) and an ethylene glycol was drawn at 120° C. into 3.5 times in the longitudinal direction and into 3.6 times in the transverse direction, and was heat-treated at 180° C. to obtain a biaxially drawn film having a thickness of 15 µm. The procedure was then carried out in the same manner as in Example 1 with the exception of laminating the biaxially drawn film at a speed of 200 m/min. Table 1 shows the properties of the laminated film and the film on the can barrel as well as the results of preservation test.

(Example 5)

The procedure was carried out in the same manner as in Example 1 with the exception of using an ironing ring (having an inner diameter of 66.299 mm) in subjecting the laminated metal sheet used in Example 1 to the thickness-reducing redraw-forming, so that the thickness of the side wall was changed by −035% with respect to the blank thickness. Table 1 shows properties of the laminated film and the film on the can barrel as well as the results of preservation test.

(Comparative Example 1)

The biaxially drawn film used in Example 1 was heat-laminated by heating the sheet at a temperature of 260° C., heating the laminate rolls at a temperature of 90° C., and feeding the sheet at a speed of 10 m/min. in order to form a cup in the same manner as in Example 1 and, then, the procedure was carried out in the same manner as in Example 1 with the exception of effecting the heat treatment at 235° C. Table 1 shows properties of the laminated film and the film on the can barrel as well as the results of preservation test. The film cracked in the vicinities of neck portion and the metal sheet corroded, from which it was judged that the can was not suited for practical use.

(Comparative Example 2)

A 350-g two-piece can was obtained in the same manner as in Example 1 with the exception of heat-laminating the biaxially drawn film used in Example 4 by heating the sheet at a temperature of 230° C., heating the laminate rolls at a temperature of 110° C., and feeding the sheet at a speed of 10 m/min. However, the film broke at the upper portion of the can and de-lamination took place to a conspicuous degree, from which it was judged that the can was not suited for practical use. Table 1 shows properties of the laminated film.

(Comparative Example 3)

The procedure was carried out in the same manner as in Example 1 with the exception of heat-laminating the biaxially drawn film used in Example 1 at the same sheet temperature, same laminate roll temperature and same sheet feeding speed as those of Example 1, and further effecting the heating at 250° C. for two minutes followed by quick quenching. Table 1 shows the properties of the laminated film, the film on the can barrel and the results of preservation test. The film cracked at a dent portion and the metal sheet corroded to a considerable degree. The film also cracked at the wrap-seamed portion and the metal sheet corroded, from which it was judged that the can was not suited for practical use.

(Comparative Example 4)

The biaxially drawn film used in Example 1 was heat-laminated by heating the sheet at a temperature of 260° C., heating the laminate rolls at a temperature of 110° C., and feeding the sheet at a speed of 20 m/min. in order to form a 350-g two-piece can in the same manner as in Example 1 and, then, the procedure was carried out in the same manner as in Example 1 with the exception of heat-treating the two-piece can at 250° C. to evaluate the can. Table 1 shows the properties of the laminated film and film on the can barrel as well as the results of preservation test. The film cracked in the vicinities of the wrap-seamed portion and, besides, the metal sheet corroded in the vicinities of the neck where the film had not been cracked. Totally considered, therefore, the can was not suited for practical use.

TABLE 1

| Run No. | Properties of laminated film | | | Forming property | Properties of film on barrel | | | | Trans ratio at upper portion | | Evaluation after having preserved cola (for 1 year at room temp.) |
|---|---|---|---|---|---|---|---|---|---|---|---|
| | $\Delta n_1$ | $\Delta n_2$ | $\Delta n_3$ | | $\Delta n_4$ | $\Delta n_5$ | $\Delta n_6$ | $\Delta n_7$ | surface side | metal side | |
| Example 1 | 0.060 | 0.070 | 0.020 | good | 0.140 | 0.160 | 0.160 | 0.050 | 0.35 | 0.60 | normal |
| Example 2 | 0.040 | 0.045 | 0.020 | good | 0.120 | 0.140 | 0.100 | 0.040 | 0.38 | 0.42 | normal |
| Example 3 | 0.030 | 0.040 | 0.005 | good | 0.140 | 0.200 | 0.140 | 0.020 | 0.35 | 0.64 | normal |
| Example 4 | 0.090 | 0.110 | 0.040 | good | 0.130 | 0.170 | 0.090 | 0.060 | 0.50 | 0.65 | normal |
| Example 5 | 0.040 | 0.045 | 0.020 | good | 0.140 | 0.160 | 0.150 | 0.040 | 0.48 | 0.55 | normal |
| Comp. Example 1 | 0.100 | — | 0.010 | good | 0.010 | — | — | 0.000 | 0.60 | 0.92 | corroded in the vicinity of neck |
| Comp. Example 2 | 0.150 | — | 0.000 | upper part of can not good | not measurable | not measurable | not measurable | not measurable | not measurable | not measurable | not carried out |
| Comp. Example 3 | 0.000 | — | 0.000 | good | 0.080 | — | — | 0.020 | 0.65 | 0.84 | corroded in the wrap-seamed portion and in the vicinity of neck |
| Comp. Example 4 | 0.020 | — | 0.000 | good | 0.000 | 0.000 | 0.000 | 0.000 | 1.04 | 0.88 | corroded in the wrap-seamed portion and in the vicinity of neck |

According to the present invention, the laminated polyester film comprises a portion of a low double refraction on the side of the metal sheet, a portion of a relatively high double refraction on the side of the front surface thereof, and a portion having peak in the double refraction in a way from the side of the front surface to the side of the metal sheet.

That is, the polyester-metal laminated sheet can be subjected to severe working such as deep-draw-forming or deep-draw-ironing, the film exhibiting favorable adhesiveness to the metal without being broken, peeled off, or without developing cracks or pinholes. Besides, the laminated film after the working does not permit the occurrence of underfilm corrosion (UFC) and exhibits excellent corrosion resistance. Moreover, not only the above-mentioned properties are maintained in the neck portion and the vicinities thereof of the seamless can but excellent dent resistance and wrap-seam workability are obtained in these portions as well.

In the seamless can of the present invention, furthermore, the film at the upper portion of the side wall of the can exhibits a peak ($P_1$) in the double refraction due to the biaxial orientation and a peak ($P_2$) in the double refraction on the side of the metal sheet due to the monoaxial orientation and crystallization, thereby to impart high degree of orientation to a portion of low orientation of the polyester and, hence, to improve barrier property against corrosive components. Accordingly, underfilm corrosion (UFC) is prevented even for the highly corrosive contents, and workability is not deteriorated by random crystallization in the lowly oriented portions.

What is claimed is:

1. A polyester-metal laminated sheet obtained by laminating a polyester film on a metal sheet, said polyester film comprising a copolymerized polyester derived from a dibasic acid comprising terephthalic acid, and optionally, isophthalic acid or one or more other dibasic acids, and a diol comprising ethylene glycol, and optionally, one or more other diols, on at least an interior surface, wherein the other dibasic acids are included in amounts no larger than 3 molecular percent, and the diol component comprises not less than 95 molecular percent ethylene glycol, wherein the polyester film in the laminated sheet has a distribution of birefringence in the direction of thickness of the film layer comprising (i) a surface layer thereof having birefringence ($\Delta n_1$) of from 0.020 to 0.140, (ii) a layer contacting the metal sheet thereof having a birefringence ($\Delta n_3$) of from 0.005 to 0.100 and smaller than $\Delta n_1$, and (iii) an intermediate layer in a thickness direction thereof having at least one peak of birefringence ($\Delta n_2$) larger than $\Delta n_1$, and $\Delta n_3$, said birefringence $\Delta n_1$, $\Delta n_2$, $\Delta n_3$ being defined by the following formula:

$$\Delta n_{1\ to\ 3} = n_m - n_t \quad (1)$$

wherein $n_m$ is a refractive index in the direction of a maximum orientation of the film, and $n_t$ is a refractive index in the direction of thickness of the film.

2. A polyester-metal laminated sheet according to claim 1, wherein said intermediate layer has at least one peak of birefringence ($\Delta n_2$) which is from 0.020 to 0.160 and is higher by at least 0.005 than the birefringence corresponding to the foot of the peak of the higher side.

3. A polyester-metal laminated sheet according to claim 1 wherein said intermediate layer having at least one peak of birefringence ($\Delta n_2$) is located at a position of 1/50 to 9/10 of the thickness of the film from the surface of said film layer.

4. A seamless can having excellent dent resistance obtained by deep-draw-forming or deep-draw-ironing a polyester-metal laminated sheet obtained by laminating a polyester film on a metal sheet into a cup having a bottom, and heat-treating the thus formed cup, said polyester film comprising a copolymerized polyester derived from a dibasic acid comprising terephthalic acid, and optionally, isophthalic acid or one or more other dibasic acids, and a diol comprising ethylene glycol, and optionally, one or more other diols, on at least an interior surface, wherein the other dibasic acids are included in amounts no larger than 3 molecular percent, and the diol component comprises not less than 95 molecular percent ethylene glycol, wherein said polyester film in the can, at an upper portion of the side wall of the can, has a distribution of birefringence in the direction of thickness of the film layer comprising (i) a surface layer thereof having a birefringence ($\Delta n_4$) of from 0.020 to 0.180, (ii) a layer contacting the metal sheet thereof having a birefringence ($\Delta n_7$) of from 0.005 to 0.100 and smaller than $\Delta n_4$, and (iii) an intermediate layer in a thickness direction thereof having at least two peaks of birefringence ($\Delta n_5$, $\Delta n_6$), wherein the peak of birefringence $\Delta n_5$ is located in a first intermediate layer close to the surface layer, and the peak of birefringence $\Delta n_6$ is located in a second intermediate layer close to the metal sheet, wherein said birefringence $\Delta n_4$, $\Delta n_5$, $\Delta n_6$ and $\Delta n_7$ is defined by the following formula:

$$\Delta n_{4\ to\ 7} = n_h - n_t \quad (2)$$

wherein $n_h$ is a refractive index of the film in the lengthwise direction of the can, $n_t$ is a refractive index in the direction of thickness of the film, and the film at the upper portion of the side wall of the can is sampled from a neck portion of the can on an axis in a direction at right angles with a direction in which the metal sheet is rolled.

5. A seamless can according to claim 4, wherein said first intermediate layer has a peak of birefringence ($\Delta n_5$) of from 0.020 to 0.220 and is higher by at least 0.005 than the birefringence corresponding to the foot of the peak of the higher side, and said second intermediate layer has a peak of birefringence ($\Delta n_6$) of from 0.010 to 0.200 and is higher by at least 0.005 than the birefringence corresponding to the foot of the peak of the higher side.

6. A seamless can according to claim 4, wherein said first intermediate layer having a peak of birefringence ($\Delta n_5$) is located at a position of from 1/50 to 9/10 of the thickness of the film from the side of the surface thereof, and said second intermediate layer having a peak of birefringence ($\Delta n_6$) is located at a position of from 1/10 to 49/50 of the thickness of the film from the side of the surface thereof, wherein said two peaks are separated away from each other.

7. A seamless can according to any one of claims 4 to 6 wherein an upper portion of the side wall of the can has a trans ratio (Rt) of ethylene gycol residue group, found by measuring the infrared-ray absorption by the ATR (attenuated total reflection) method, of from 0.1 to 1.5 on the side of the front surface of the film and of from 0.1 to 1.5 on the side contacting the metal sheet.

8. A polyester-metal laminated sheet according to claim 1, wherein at least a surface of the polyester film layer in the laminated sheet comprises a copolymerized polyester derived from a dibasic acid comprising a terephthalic acid, an isophthalic acid, and another dibasic acid, wherein said another dibasic acid is present in an amount not greater than 3 molecular percent, and a diol comprising ethylene glycol, wherein said ethylene glycol is present in an amount not less than 95 molecular percent.

9. A polyester-metal laminated sheet according to claim 1, wherein the polyester film layer in the laminated sheet has a trans ratio (Rt) of ethylene glycol residue found by measuring the IR absorption by the ATR method from 0.1 to 1.5 on the surface of said film layer.

10. A seamless can according to claim 4 wherein at least the surface of the polyester film layer in the can comprises a copolymerized polyester derived from a dibasic acid comprising terephthalic acid, an isophthalic acid, and another dibasic acid, wherein said another dibasic acid is present in an amount not greater than 3 molecular percent, and a diol comprising ethylene glycol, wherein said ethylene glycol is present in an amount not less than 95 molecular percent.

* * * * *